United States Patent [19]

Nielsen

[11] 4,187,257

[45] Feb. 5, 1980

[54] RADIATION CURABLE VINYL ESTER RESIN

[75] Inventor: Robert C. Nielsen, Lake Jackson, Tex.

[73] Assignee: The Dow Chemical Company, Midland, Mich.

[21] Appl. No.: 897,311

[22] Filed: Apr. 18, 1978

[51] Int. Cl.$^2$ ............................................. C08L 63/00
[52] U.S. Cl. ........................... 525/445; 204/159.15; 204/159.19; 525/529
[58] Field of Search .................. 260/836, 837 R, 861, 260/873

[56] References Cited

U.S. PATENT DOCUMENTS

| | | | |
|---|---|---|---|
| 3,066,112 | 11/1962 | Bowen | 260/41 |
| 3,256,226 | 6/1966 | Fekete | 260/837 R |
| 3,367,992 | 2/1968 | Bearden | 260/837 R |
| 3,506,736 | 4/1970 | Najvar | 260/835 |
| 3,679,131 | 7/1962 | Parker | 260/475 P |
| 3,690,927 | 9/1972 | Parker | 117/93.31 |
| 3,725,116 | 4/1973 | Parker | 117/93.31 |
| 3,754,054 | 8/1973 | Kimura | 260/873 |
| 3,785,849 | 1/1974 | Parker | 260/475 P |
| 3,926,641 | 12/1975 | Rosen | 204/159.23 |
| 4,004,998 | 1/1977 | Rosen | 204/195.22 |
| 4,014,771 | 3/1977 | Rosenkranz | 260/836 |
| 4,035,321 | 7/1977 | Shahidi | 260/873 |
| 4,049,634 | 9/1977 | Ko | 260/837 R |
| 4,067,857 | 1/1978 | Muntz | 528/285 |
| 4,072,592 | 2/1978 | Due | 260/836 |
| 4,072,657 | 2/1978 | Tanaka | 260/836 |

FOREIGN PATENT DOCUMENTS 2408893   4/1975   Fed. Rep. of Germany .

*Primary Examiner*—Paul Lieberman

[57] ABSTRACT

Radiation curable resins providing high cross-link density while maintaining relatively low viscosity result from the reaction of a polyepoxide and a monoester of a dicarboxylic acid and a di- or tri-acrylate of pentaerythritol.

8 Claims, No Drawings

RADIATION CURABLE VINYL ESTER RESIN

BACKGROUND OF THE INVENTION

Unsaturated polyesters and the terminally unsaturated vinyl ester resins resulting from the esterification of unsaturated monocarboxylic acids and polyepoxides have found widespread utility in diverse applications, such as coatings, laminates, moldings and the like. Such resins are known to be polymerizable by exposure to ultraviolet light.

The viscosity of such resins is usually so great as to make fabrication by the usual techniques extremely difficult and impractical. It is commonplace to reduce the viscosity by blending the resin with a relatively low molecular weight monounsaturated reactive diluent, such as styrene or the alkylacrylates, which react with the unsaturation of the resin. In so doing the degree of functionality of the resin system is lowered with a consequent alteration of the properties. Also such reactive diluents are frequently volatile or toxic materials.

It would be desirable to have such a polyester or vinyl ester resin system which would have a high crosslink density without requiring excessive amounts of volatile diluents.

SUMMARY OF THE INVENTION

The present invention provides resin systems based on polyesters or vinyl ester resins which have a high crosslinking potential inherent in the body of the resin molecule. That potential results from the inclusion in the resin of a half ester of a dicarboxylic acid of pentaerythritol having at least two of the remaining three hydroxyl groups esterified with acrylic or methacrylic acid with the remaining third hydroxyl being an acrylic or methacrylic acid ester or being capped with some other group that is unreactive with an oxirane group.

DETAILED DESCRIPTION OF THE INVENTION

The benefits derivable from this invention are obtained from polyunsaturated terminal groups on the polyester or vinyl ester resin.

Unsaturated polyesters that are curable by known means, may be prepared from an unsaturated polycarboxylic acid, such as maleic acid and a polyhydric alcohol such as ethylene glycol. For radiation cure it is preferred that the molecule be terminally unsaturated as results, for example, from the reaction of acrylic acid and a hydroxyl terminated polyester.

The preparation of hydroxyl terminated unsaturated polyesters is well known in the art.

Generally, in the preparation of suitable polyesters, an $\alpha,\beta$-ethylenically unsaturated dicarboxylic acid such as maleic acid, fumaric acid, itaconic acid or the like is interesterified with an alkylene glycol or polyalkylene glycol having a molecular weight of up to 2000 or thereabouts. Frequently, dicarboxylic acids free of ethylenic unsaturation such as phthalic acid, isophthalic acid, tetrabromophthalic acid, chlorendic acid, adipic acid, succinic acid and the like may be employed within a molar range of 0.25 to as much as 15 moles per mole of the $\alpha,\beta$-unsaturated dicarboxylic acid.

The glycol or polyhydric alcohol component of the polyester is usually stoichiometric or in slight excess with respect to the sum of the acids. The excess of polyhydric alcohol seldom will exceed 20–25 percent and usually is about 10 to 15 percent.

These unsaturated polyesters may be generally prepared by heating a mixture of the polyhydric alcohol with the dicarboxylic acid or anhydride in the proper molar proportions at elevated temperatures, usually at about 150° to 250° C. for a period of time ranging from about 1 to 10 hours. Polymerization inhibitors such as t-butyl catechol may be advantageously added. It is also possible to prepare unsaturated polyesters directly from the appropriate oxide rather than the glycol, e.g., propylene oxide can be used in place of propylene glycol.

Preferred unsaturated polyesters for the practice of the present invention are prepared by reacting between about 10 to 25 percent molar excess of an alkylene glycol having the formula

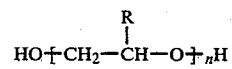

wherein R is H or a lower alkyl group and n is an integer from 1 to 4 with a mixture comprising about 1 to 4 parts by weight of an $\alpha,\beta$-unsaturated dicarboxylic acid or anhydride and about 4 to 1 parts by weight of a dicarboxylic acid or anhydride without ethylenic unsaturation. The condensation is effected at about 200° C. and continued until the acid content drops to about 2 to 12 percent. The polyester may then be cooled and admixed with a polymerizable monomer containing >C=CH$_2$ groups.

Other unsaturated polyesters can be made using alkylene glycols having the formula

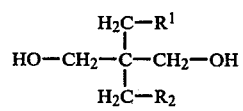

wherein $R_1$ and $R_2$ are selected from hydrogen, a lower alkyl group or a halogen.

When isophathalic unsaturated polyesters are prepared, it is advantageous to use a split glycol technique, e.g., the isophthalic acid is reacted with an amount of glycol sufficient to lower the carboxyl content rapidly, then the unsaturated dicarboxylic acid and the remainder of the glycol is added and the reaction continued to the desired percent —COOH. It is well known in the art that temperatures greater than 225° C. are advantageous when producing these isophthalic polyesters.

Vinyl ester resins, by definition, are terminally unsaturated. Such resins are prepared by reacting about equivalent proportions of a polyepoxide resin and an unsaturated monocarboxylic acid wherein

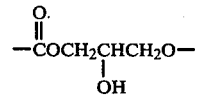

linkages are formed and the resulting resin has terminal, polymerizable unsaturated groups. For example, two equivalents of methacrylic acid may be reacted with two equivalents of a polyepoxide resin to produce a vinyl ester resin.

Vinyl ester resins are described in U.S. Pat. No. 3,367,992 to Bearden wherein dicarboxylic acid half-esters of hydroxyalkyl acrylates or methacrylate are reacted with polyepoxide resins. Bowen in U.S. Pat. Nos. 3,066,112 and 3,179,623 describes the preparation of vinyl ester resins from monocarboxylic acids such as acrylic and methacrylic acid. Bowen also describes an alternate method of preparation wherein a glycidyl methacrylate or acrylate is reacted with the sodium salt of a dihydric phenol such as bisphenol A. Vinyl ester resins based on epoxy novolac resins are described in U.S. Pat. No. 3,301,743 to Fekete et al. Fekete et al. also describe in U.S. Pat. No. 3,256,226 vinyl ester resins wherein the molecular weight of the polyepoxide is increased by reacting a dicarboxylic acid with the polyepoxide resin as well as acrylic acid, etc.

Briefly, any of the known polyepoxides may be employed in the preparation of the vinyl ester resins of this invention. Useful polyepoxides are glycidyl polyethers of both polyhydric alcohols and polyhydric phenols, flame retardant epoxy resins based on tetrabromo bisphenol A, epoxy novolacs, epoxidized fatty acids or drying oil acids, epoxidized diolefins, epoxidized diunsaturated acid esters as well as epoxidized unsaturated polyesters, so long as they contain more than one oxirane group per molecule. The polyepoxides may be monomeric or polymeric.

Preferred polyepoxides are glycidyl polyethers of polyhydric alcohols or polyhydric phenols having weight per epoxide group of about 150 to 2,000. These polyepoxides are usually made by reacting at least about 2 moles of an epihalohydrin or glycerol dihalohydrin with 1 mole of the polyhydric alcohol or polyhydric phenol, and a sufficient amount of a caustic alkali to combine with the halogen of the halohydrin. The products are characterized by the presence of more than one epoxide group per molecule, i.e., a 1,2-epoxy equivalency greater than one.

In the concept of this invention all or a part of the monounsaturated terminal groups of the polyester or vinyl ester resin are replaced with a polyunsaturated terminal moiety. That is accomplished by esterifying the terminal hydroxyls of a polyester or the terminal oxirane groups of a polyepoxide with a half-ester of a dicarboxylic acid and pentaerythritol polyesterified with at least two equivalents of acrylic or methacrylic acid. That half-ester has the formula:

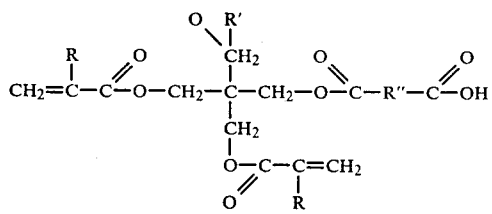

wherein R is hydrogen or methyl; R' is acrylyl or methacrylyl, hydrogen, a saturated or unsaturated aliphatic group, or an aryl group; and R" is a divalent saturated aliphatic group, a divalent arylene group or an unsaturated aliphatic group of the formula:

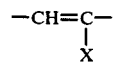

wherein X is hydrogen, chlorine or an aryl group.

The pentaerythritol half-ester is prepared by known esterification procedures from pentaerythritol, acrylic or methacrylic acid and a variety of dicarboxylic anhydrides. Representative anhydrides suitable for preparing the half-esters include the unsaturated anhydrides, such as maleic anhydride, chloromaleic anhydride, citraconic anhydride and itaconic anhydride; arylanhydrides, such as phthalic anhydride; and saturated anhydrides, such as methyl tetrahydrophthalic anhydrides. Other useful anhydrides will be readily apparent to those skilled in the esterification art.

The half-ester may be made by the simultaneous esterification of pentaerythritol with the acrylic acid and the anhydride. It is preferable, however, to employ a stepwise procedure wherein the pentaerythritol is esterified to the desired extent with the acrylic acid and that product then esterified with the anhydride.

In the sequential preparation the partial acrylate esters of pentaerythritol may be easily prepared from the acrylic or methacrylic acid and that hydroxyl compound under conventional conditions of time, pressure and temperature using known esterification catalysts such as p-toluene sulfonic acid, and a polymerization inhibitor, such as hydroquinone, the methyl ether of hydroquinone or other known inhibitor. Alternatively the partial acrylate ester can be prepared employing acrylyl or methacrylyl chloride.

The half-ester is prepared from the partial acrylate ester and the dicarboxylic anhydride in stoichiometric ratio of those reactants with no more than a 5 to 10 percent variance. A polymerization inhibitor, generally in an amount of from about 300 to 1000 parts per million, is necessary. Esterification is induced and maintained at a temperature of from about 20 to about 150° C., preferably 80° to 125° C., for a few minutes to several hours usually 2 to 10 hours being sufficient for substantial completion of the esterification. Ambient to a slight positive pressure of from about 5 to 10 pounds per square inch is preferred to prevent volatilization of the partial acrylate ester or the anhydride.

The resin of the invention is prepared by the esterification of the terminal oxirane of the polyepoxide or the terminal hydroxyl of the polyester with the half-ester. That esterification is achieved in almost quantitative yields by blending the reactants with an esterification catalyst for the appropriate reaction (acid/epoxy or acid/hydroxyl) and elevating the temperature of the reaction charge, preferably from about 80 to about 115° C., until the reaction is complete, usually in a few hours of from about 3 to 8 hours although longer times may be required in some instances.

Useful catalysts will be known. For example, with the acid/epoxy reaction it is known that trivalent chromium compounds, such as chromium acetate or chloride, are useful. Cocatalysts, such as tertiary amines, as, for example, tris(dimethylaminomethyl)phenol sold as DMP-30, may also be used.

The benefit of high crosslinking potential is achieved when at least some and preferably all of the terminal groups of the polyepoxide or polyester are esterified with the half-ester. Any terminal groups not so esterified should be capped with an unsaturated monocarboxylic acid, as acrylic or methacrylic acids. Such mixed products are easily prepared by simultaneous or stepwise esterification using the stoichiometric amounts of each reactant desired in the final product.

The resins as thus prepared are useful as such or may be diluted with a reactive diluent if needed for making thin films and coatings. Preferably when a reactive diluent is employed, it will be used in the minimum amount required to achieve the desired viscosity and it will be relatively nonvolatile. Acetoxypropyl acrylate and methacrylate is one such diluent. Other examples of these monomers are butyl acrylate, butyl methacrylate, 2-ethylhexyl acrylate, lauryl acrylate, amyl methacrylate, n-octyl acrylate, isooctyl acrylate, isodecyl methacrylate, 2,4,4-trimethyl-2-pentyl acrylate, 2,4,4-trimethyl-2-penyl methacrylate, methyl acrylate, ethyl acrylate, isobutyl acrylate, 2-ethylhexylacrylate, isobutyl methacrylate, hydroxyethyl acrylate, hydroxypropyl acrylate, t-butylaminoethyl acrylate, stearyl methacrylate, silane methacrylate, butyl cellosolve acrylate, cyclohexyl acrylate, n-decylacrylate, n-decylmethacrylate, 2-ethoxy methacrylate, 2-ethylhexyl methacrylate, octadecyl acrylate, oleyl methacrylate, tetrahydropyranyl methacrylate, tridecyl methacrylate, 2,4,4-trimethyl pentane diol isobutyrate, 3-methacrylate and the like.

Even when such a diluent is required, less will generally be needed to arrive at a given viscosity than would be needed with the prior known polyesters and vinyl ester resins. Also with the increased potential for cross-linking in the resins of this invention, there is less adverse effects on the properties of the cured product than with those prior resins. Usually an amount of diluent not more than about 25 weight percent of the total amount of resin and diluent will suffice for attaining even drastic reductions in viscosity as needed for example in preparing thin films and coatings.

The resins of this invention are further modified by known procedures prior to curing. Thus, the secondary hydroxyls resulting from esterification of an oxirane group may be reacted with a Group II metal oxide or hydroxide to provide thickened resins useful in sheet molding compound and bulk molding compound. Other modifications will be apparent.

The resins of the invention may be used in filled and unfilled formulations or in reinforced plastic compositions employing known materials in the usual amounts. In all such situations the product properties that are dependent on the resinous component are improved.

The resins find use in coatings such as inks, metal decoration, coil coating, paper coating, wood coating and plastic coating. They can also be used in the production of laminates.

Although the resins may be cured by chemical free radical catalysts, such as benzoyl peroxide, they are admirably well adapted to cure by radiation inducement particularly photochemical radiation. In that latter instance it is necessary to include in the composition a photoinitiator or a combination of a photoinitiator and a photosensitizer. Such materials have been described in the literature.

The resins may also be readily cured by ionizing radiation using known procedures, dosages and dose rates as disclosed in numerous patents.

The concept of the invention will be more apparent from the following non-limiting examples. All parts and percentages are by weight.

Example 1

Into a 2-liter, 5-neck Pyrex resin flask fitted with a means of agitation, temperature control, and addition of other raw materials was added:

| | |
|---|---|
| Pentaerythritol tri acrylate mixture (2.72% OH) | 625 gms |

| -continued | |
|---|---|
| Phthalic anhydride | 148 gms |
| Hydroquinone, 500 ppm of total | 0.4 gm |

This mixture was heated to 110°–125° C. for a period of approximately 8 hours until the weight percent acid was 6.1 percent. This mixture was then allowed to cool overnight to ambient temperature. The following day the mixture was heated to 110°–115° C. and to the mixture was added:

| | |
|---|---|
| Diglycidyl ether of bisphenol A (DGEBA) (190 eq. wt.) | 206 gms |
| Chromium acetate (25% solids in methanol) 0.125% based on epoxy | 0.4 gm | the acid-epoxy reaction advanced until the weight percent acid (COOH) was less than 1.0 percent. This was identified as Resin A. A portion of this resin was blended to 75 percent solids with 2-acetoxypropyl acrylate. The resin was clear with no gel particles evident. The base resin had a viscosity of 12,036 centipoise at 60° C. while the diluted sample had a viscosity of 5880 centipoise at 25° C.

A thin film catalyzed with 2.5 percent N,N-dimethyl aniline/2.5 percent benzophenone photoinitiators was passed under a 200 watt/in. Hanovia UV lamp at a rate of 100 feet per minute and cured in air in 2 passes to a tack-free surface. The film could not be scratched with the fingernail, passed 95 percent retained adhesion using the crosshatched tape method using Borden Mystik Tape and passed 60 double rubs with methyl ethyl ketone.

Example 2

A resin similar to Example 1 was prepared using dodecenylsuccinic anhydride in place of phthalic anhydride plus a catalyst to enhance the partial ester preparation.

| | |
|---|---|
| Pentaerythritol tri(tetra)acrylate mixture (2.72% OH) | 625 gms |
| Dodecenylsuccinic anhydride | 266 gms |
| Hydroquinone, 500 ppm | 0.5 gm |
| Triphenylphosphine | 0.3 gm |

This mixture was heated to 110°–115° C. for a period of 8 hours until the weight percent acid was 5.1 percent. This mixture was then allowed to cool to ambient. Later this product (partial ester) was heated to 110°–118° C. and the following materials were charged.

| | |
|---|---|
| DGEBA | 178 gms |
| Chromium acetate (25% solids in methanol, 0.125% of epoxy) | 0.2 gm |

The acid-epoxy reaction advanced until the weight percent acid (COOH) was 1.5 percent. This was identified as Resin B. Then, to the mix was added:

| | |
|---|---|
| Tris (dimethyl aminomethyl)phenol (DMP-30) | 0.3 gm |

The acid-epoxy reaction advanced until the weight percent acid was less than 1.0. A portion of this resin was blended to 25 percent with 2-acetoxypropyl acrylate.

Example 3

A resin similar to Example 1 was prepared using tetrahydrophthalic anhydride in place of phthalic anhydride plus a catalyst to enhance the partial ester preparation.

| | |
|---|---|
| Pentaerythritol tri(tetra)acrylate mixture (2.72% OH) | 625 gms |
| Tetrahydrophthalic anhydride | 152 gms |
| Hydroquinone, 500 ppm total | 0.5 gm |
| Triphenylphosphine | 0.3 gm |

This mixture was heated to 110°–115° C. for 8 hours until the weight percent acid (COOH) was 5.9 percent. This mixture was then allowed to cool to ambient. This was identified as Resin C. Later this product (partial ester) was heated to 110°–118° C. and the following materials were added:

| | |
|---|---|
| DGEBA | 210 gms |
| Chromium acetate (25% solids in methanol - 0.125% of soln. based on epoxy) | 0.2 gm |

The acid-epoxy reaction advanced until the weight percent acid was less than 0.6 percent. A portion of this resin was blended to 25 percent with 2-acetoxypropyl acrylate.

Example 4

The properties of the resins of the above 3 examples and the tests run on the products made therefrom are tabulated in the following table.

TABLE

| | Resin A | Resin B | Resin C |
|---|---|---|---|
| Viscosity | | | |
| Base Resin | | | |
| Kinematic 60° C. (centistokes) | 12,036 | 4,058 | 8,137 |
| 25% Acetoxypropyl acrylate | | | |
| Brookfield MPT 25° C., cps | 5,900 | 2,200 | 5,000 |
| UV Cure Rate (DMA/-Benzophenone) Cure Rate | | | |
| (No. passes to tack free) | 2 | 2 | 2 |
| Adhesion (% retained) | | | |
| Bonderite 37 | 95 | 100 | 95 |
| Tin-free Steel | 0 | 0 | 0 |
| MEK Resistance (No. double rubs to failure) | 60 | 35 | 53 |
| Water Boil, 2 hours | pass | pass | pass |
| Pencil Hardness | 8H+ | 8H+ | 8H+ |

What is claimed is:

1. A radiation curable composition comprising the terminally unsaturated ester of (1) a polyepoxide or a hydroxyl terminated polyester and (2) a monoester of a substituted pentaerythritol and a dicarboxylic acid, said monoester having the formula

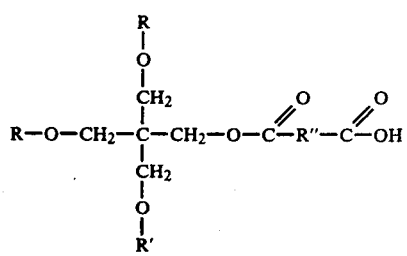

wherein R is individually acrylyl or methacrylyl, R' is acrylyloxy, methacrylyloxy, hydrogen, a saturated aliphatic group, an unsaturated aliphatic group, or an aromatic group, and R" is a divalent saturated aliphatic group, a divalent arylene group or an unsaturated aliphatic group of the formula

wherein X is a halogen or an aromatic group.

2. The composition claimed in claim 1 wherein R" is orthophenylene.

3. The composition claimed in claim 1 wherein R" is —CH=CH—.

4. The composition of claim 1 wherein said monoester is the pentaerythritol triacrylate half-ester of phthalic anhydride.

5. The composition of claim 1 wherein said monoester is the pentaerythritol diacrylate half-ester of phthalic anhydride.

6. The composition of claim 1 wherein said polyepoxide is the diglycidyl ether of bisphenol A.

7. The composition of claim 1 additionally containing a monounsaturated monomer.

8. The composition of claim 7 wherein said monomer is acetoxypropyl acrylate.